Dec. 25, 1934.  W. J. PEARMAIN  1,985,422
CLUTCH
Filed March 28, 1932
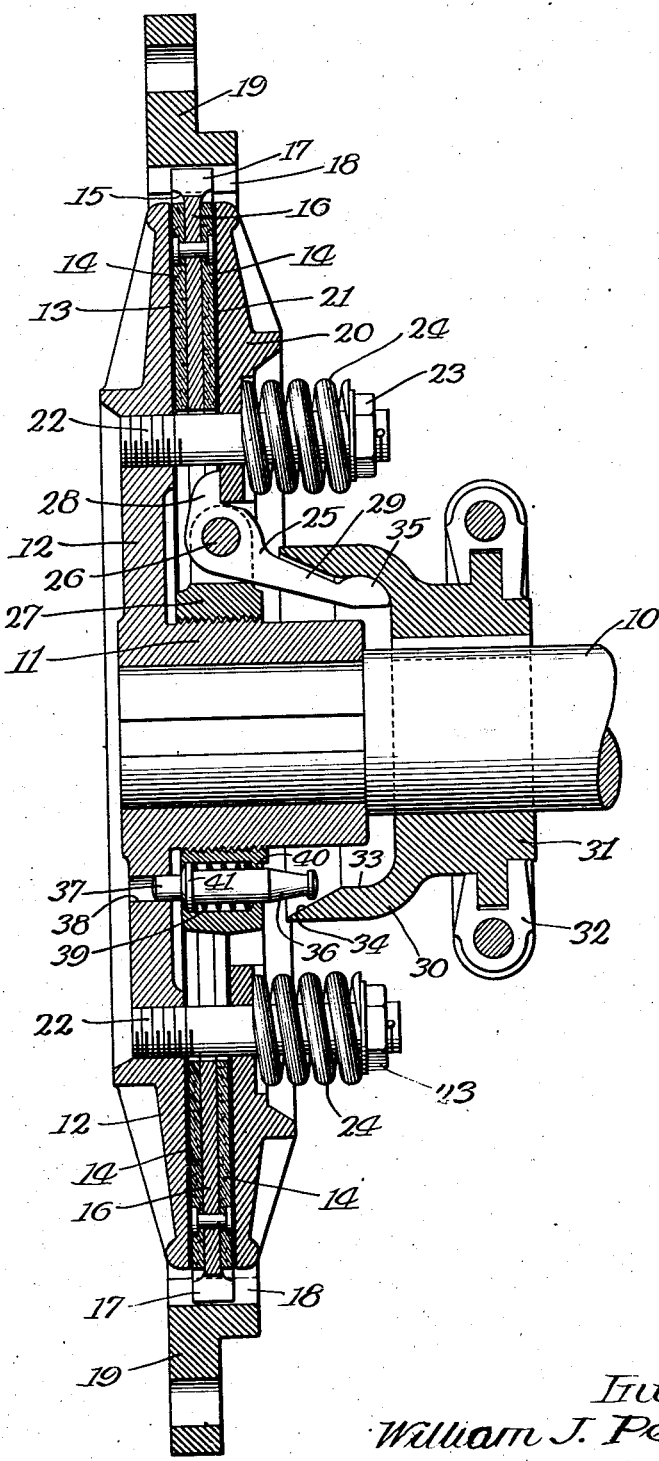
Inventor:
William J. Pearmain
By Rector, Hibben, Davis & Macauley Attys.

Patented Dec. 25, 1934

1,985,422

UNITED STATES PATENT OFFICE 1,985,422

CLUTCH

William J. Pearmain, Racine, Wis., assignor to Twin Disc Clutch Company, Racine, Wis., a corporation of Wisconsin Application March 28, 1932, Serial No. 601,494

4 Claims. (Cl. 192—68)

My invention relates to clutches and more particularly to a device of this character in which transmission of power is effected through mechanism which is normally in driving engagement.

One object of my invention is to devise a clutch of the spring loaded type in which a driving plate is interposed between, and has driving engagement with, a pair of gripping members, release of these parts being effected by a plurality of suitably actuated clutch levers which are adapted for adjustment as the clutch facings wear in order to permit a full driving engagement of the parts when the releasing force is removed.

A further object is to devise a clutch of the type indicated which is characterized by a compactness and thinness of design through a novel arrangement for partially housing the clutch levers between, or in which a portion of each lever is substantially included within the outline of, the gripping members.

A further object is to provide a clutch in which the inner or releasing ends of the clutch levers engage with the inner face of the pressure plate which constitutes one of the gripping members, provision being made for laterally shifting the position of the levers as the facings wear, so that the levers will not interfere with the movements of the pressure plate to driving position.

A further object is to devise a clutch which is characterized by simplicity of design, ease of, and accessibility for adjustment, and a capacity for being installed in locations where the available space is restricted.

These and further objects of my invention will be set forth in the following specification, reference being had to the accompanying drawing, and the novel means whereby said objects are effectuated will be definitely pointed out in the claims.

The drawing is a sectional elevation of my improved clutch, the several parts being shown in a released position, and it being further understood that, when viewed endwise, the clutch possesses a generally circular outline.

Referring to the drawing, the numeral 10 designates a shaft which constitutes one of the rotary parts of the device and which, in the present instance, will be considered as the driven member, although the conditions of operation may be reversed in this particular, as will be readily understood. The left end of the shaft is keyed or otherwise secured to a hub 11 which has provided thereon a fixed plate 12 which constitutes one of the gripping members of the clutch.

The plate 12 is provided with an annular wearing face 13 which is intended to engage with a facing 14 of frictional material riveted in a counterbored recess 15 provided on the adjacent side of a driving plate 16. The peripheral edge of the plate 16 is provided with a plurality of teeth 17 which mesh with similar teeth 18 formed internally on an annular plate 19 that constitutes the other rotary part of the clutch and which in the present instance, is the driving member thereof. As shown clearly in the drawing, the teeth 18 are somewhat longer than the teeth 17, so that the plate 16 is capacitated for axial movement relative to the plate 19, this construction being availed of to insure a positive release of the friction facing 14 from the fixed plate 12, when the clutch parts are released as hereinafter described.

On the opposite side of the plate 16 from the fixed plate 12 is a pressure plate 20 which also includes a wearing face 21 that engages with a friction facing 14 on the adjacent side of the plate 16, the last named facing being situated and affixed to the plate 16 in a manner identical with that heretofore described with respect to the left facing 14, as indicated in the drawing. The pressure plate 20 is carried by, and is shiftable relative to, the fixed plate 12 through the medium of a plurality of studs 22, one end of each of which is threaded in the plate 12 and extends through an appropriate aperture provided in the pressure plate 20 to receive on the opposite end thereof a nut 23. Between said nut and the adjacent side of the plate 20, a helical spring 24 encircles the stud 22 and serves to normally maintain driving engagement of the plate 20 with the driving plate 16 and of the latter with the fixed plate 12. As many of the studs 22 may be utilized as is prescribed by the design requirements of the clutch and it will be understood that these studs, and accordingly the springs 24, will be distributed around the shaft 10 in the most convenient and suitable manner.

As stated above, the springs 24 normally maintain driving engagement of the several parts, and in order to release these parts, or move them to the several positions shown in the drawing, the following instrumentalities are provided. A plurality of clutch levers 25 is pivotally mounted on pins 26 which are carried on an adjustable collar 27 that is threaded on the hub 11, the levers 25 being preferably equi-spaced around the shaft 10 in order to most effectively apply the releasing force as hereinafter described. The inner end of each lever 25 is provided with a stub arm 28 which bears against the inner face of the pressure plate 20, while the other arm 29 of the lever projects externally of the clutch and is received within a cup-shaped part 30 provided on a sleeve 31 that is shiftable on the shaft 10, but keyed thereto in some convenient manner, the sleeve 31 being appropriately moved by a collar 32 in the usual manner.

The part 30 comprises a cylindrical surface 33 which merges into a conical surface 34 that flares outwardly of the sleeve 31 toward the pressure plate 20. When the clutch is in a released position, the rounded noses 35 on the lever arms 29 engage with the cylindrical surface 33, but when the sleeve 31 is moved toward the right, as viewed in the drawing, these noses ride outwardly against the conical surface 34, being impelled by centrifugal force and the pressure of the springs 24.

In clutches of this type, it is customary to so position the sleeve 31 that it always engages with the noses 35 and hence, as the facings 14 wear, a point will ultimately be reached when the clutch levers will prevent a complete return of the pressure plate 20 to driving position, since the lever arms 29 will be held against adequate rotation by contact with the sleeve part 30. Under these conditions, the clutch will either not transmit any power, or it will be characterized by bad slippage.

When this condition is reached in the operation of the clutch, it is merely necessary, in the present design, to actuate the combination index and locking pin 36 which is slidably mounted in the adjusting ring 27 and comprises a part 37 which is receivable in one of several apertures 38 appropriately distributed around the fixed plate 12. The pin 36 is normally held in locking position by means of a spring 39 which encircles the pin within the ring 27, one end of the spring engaging a shoulder 40 provided in the ring and the opposite end a washer 41 which seats against a portion of the ring 27 that is peened over the hole in the ring which receives the spring 39. When the pin 36 is withdrawn, the ring 27 is rotated in the appropriate direction until the necessary clearance is obtained between the stub arm 28 and the pressure plate 20, whereupon the pin 36 may be reinserted in the nearest aperture 38.

The construction of the clutch and the arrangement of the levers is such that any desired relation can be established between the sleeve 31, levers 25 and the adjusting ring 27 for the purpose of making the best allowance for wear, that is, for example, the initial setting of the levers 25 may be such as to allow for one-half of the total wear permissible, with the adjusting ring 27 adapted for movement to take care of the remaining wear, or other arrangements may be adopted as will be readily apparent.

It will be obvious that, when the sleeve 31 is moved toward the left to occupy the position shown substantially in the drawing, thereby moving the pressure plate 20 to the released position shown, the driving plate 16 will be thrown out of contact with the fixed plate 12, owing to its capacity for shifting axially relative thereto, that is, by reason of its toothed engagement with the annular driving plate 19. One of the most important advantages of the present design is its compactness, since the clutch levers are substantially housed within the major dimensions of the clutch. The construction is therefore capable of being installed in extremely restricted locations.

I claim:

1. The combination of a driving plate shiftably connected to a rotary part, a fixed plate connected to a second rotary part and disposed on one side of said driving plate, a pressure plate connected to said fixed plate and disposed on the opposite side of said driving plate, clutch levers mounted for simultaneous adjustment on said fixed plate, each having an arm engaging a substantially aligned continuation of the working face of said pressure plate, and means for rocking said levers to release said pressure plate.

2. The combination of a driving plate connected to a rotary part, a fixed plate having a hub connected to a second rotary part and disposed on one side of said driving plate, a collar threaded on said hub, a pressure plate connected to said fixed plate and disposed on the opposite side of said driving plate, clutch levers mounted on said collar, each having an arm engaging the inner face of said pressure plate, and means for rocking said levers to release said pressure plate.

3. The combination of a driving plate connected to a rotary part, a fixed plate connected to a second rotary part and disposed on one side of said driving plate, a pressure plate connected to said fixed plate and disposed on the opposite side of said driving plate, a plurality of studs mounted in said fixed plate and extending through said pressure plate, springs carried by said studs for actuating said pressure plate into driving engagement with said driving plate, said springs bearing against said pressure plate and projecting externally of the clutch, clutch levers mounted for simultaneous adjustment on said fixed plate, each having an arm engaging a substantially aligned continuation of the working face of said pressure plate, and means for rocking said levers to release said pressure plate.

4. The combination of a driving plate having shiftable engagement with a rotary part, a fixed plate connected to a second rotary part and disposed on one side of said driving plate, a pressure plate connected to said fixed plate and disposed on the opposite side of said driving plate, clutch levers connected to said fixed plate and simultaneously adjustable relative thereto, each having an arm engaging a substantially aligned continuation of the working face of said pressure plate and a second arm projecting externally of the pressure plate, and a sleeve having an internal conical surface engageable with said second arms to release said pressure plate, said sleeve engaging with said second arms in the driving and released positions of the clutch.

WILLIAM J. PEARMAIN.